3,091,603
CURE OF HALOGENATED BUTYL RUBBER
Irving Kuntz, Roselle Park, N.J., assignor to Esso Research and Engineering Company, a corporation of Delaware
No Drawing. Filed Dec. 18, 1959, Ser. No. 860,316
4 Claims. (Cl. 260—85.3)

The present invention relates to improved non-sulfur vulcanizable compositions of halogenated copolymers of isoolefins and multiolefins. More particularly, it deals with curing chlorinated butyl rubber at accelerated rates from green stocks or rubber compounds of excellent scorch resistant properties.

The present application is a continuation-in-part of U.S. patent application Serial No. 563,977, filed February 7, 1956, now abandoned, in the names of Irving Kuntz, George E. Serniuk, Francis P. Baldwin and Robert M. Thomas.

Copolymers of the above general class, particularly where the copolymers contain about 85 to 99.5 weight percent of a $C_4$ to $C_8$ isoolefin, e.g., isobutylene, with about 15 to 0.5 weight percent of a multiolefin of about 4 to 14 carbon atoms, e.g., myrcene, isoprene, butadiene, etc. are well known in the literature as "butyl rubber." For example, see "Synthetic Rubber" by G. S. Whitby, and U.S. Patent 2,356,128 among many others. Halogenated butyl rubber-type copolymers are produced by halogenating butyl rubber in a manner which does not substantially degrade its molecular weight but however gives a rubbery product of substantially different properties than the unhalogenated material. Butyl rubber may be halogenated at temperatures of −50° to 200° C. at pressures of 0.5 to 900 p.s.i.a. with suitable halogenating agents such as gaseous chlorine, liquid bromine, iodine monochloride, etc. Halogenation may be accomplished in various ways. For example, the halogenation agent, e.g., chlorine, may be added to a solution of the copolymer in a suitable inert liquid organic solvent. The resulting halogenated polymer may be recovered by precipitation with a non-solvent at about 0 to 180° C., spray drying, or by flashing off the hydrocarbon solvent by injection into a hot water bath.

The degree of halogenation is carefully regulated so that the halogenated copolymer contains at least 0.3 weight percent of combined halogen but not more than about one atom of combined fluorine or chlorine per double bond in the polymer, nor more than three atoms of combined bromine or iodine per double bond.

The halogenated copolymer has a viscosity average molecular weight of about 100,000 to 2,000,000, and a mole percent unsaturation of between 0.1 to 20, preferably less than 10. As hereinafter employed in the specification, the term "halogenated butyl rubber" denotes the above described halogenated copolymers of a major portion of a $C_4$ to $C_8$ isoolefin and a minor portion of a $C_4$ to $C_{14}$ multiolefin.

It has very recently been suggested that such types of copolymers, particularly chlorinated butyl rubber could be advantageously cured by the use of organic compounds containing amine groups, such as phenylene diamine, hexamethylene diamine, triaminobenzene, n-decyl amine, with or without the presence of other curing agents. Although these cure systems are characterized by excellent ozone resistance, their scorching properties are substantially less than could be desired. Scorching, i.e., incipient vulcanization of a rubbery stock at the temperatures incurred in pre-vulcanization processing steps such as milling, extrusion, etc., is of great practical interest since it degrades the physical properties of the vulcanizate ultimately obtained, as well as causing great difficulties in factory operations.

It has now been discovered that a specific class of materials, namely, polyamine carbamates, cure chlorinated butyl rubber to give a vulcanizate of excellent scorch properties, e.g., a vulcanizate requiring over 10 minutes for a five point rise in Mooney scorch value at 260° F. Moreover, the polyamine carbamate cure of chlorinated butyl rubber has an exceptionally high curing rate, e.g., one-minute at 400° F., while yielding a product of very good scorch properties. This combination of fast cure rate and scorch safety is very desirable but difficult to obtain. Conventional curing agents such as sulfur and zinc oxide are normally not present, the polyamine carbamate itself serving as the primary or sole curing agent. Conventional compounding agents such as fillers and pigments, e.g., carbon black, clays, $TiO_2$, antioxidants such as phenyl-beta-naphthylamine, anti-tack agents such as stearic acid, resins, plasticizers, etc. may be incorporated in the recipe.

Curing may be effected under a broad range of temperatures, e.g., 225° to 500° F., preferably 250° to 450° F., as well as under various conditions, e.g., during extrusion, molding, open steam heating, oven curing, etc. A minor portion of the polyamine carbamates, i.e., 0.1 to 15, preferably 0.5–5, parts by weight per 100 parts by weight of halogenated rubber is employed in the recipe. The present invention is particularly well suited to wire coating, and conveyor belt production since curing can be effected extremely quickly, e.g., 1 to 3 minutes at 400° F.

The preferred polyamine carbamate curing agent is an alkyl polyamine carbamate such as ethylene diamine carbamate, hexamethylene diamine carbamate, tetramethylene diamine carbamate, phenylene diamine carbamate, 1,3,5-triaminopentane carbamate, diethylene triamine carbamate, etc.

Alkyl diamine carbamates are especially advantageous.
In general, the polyamine carbamates of the present invention are chosen from the following classes:

(1) Alkyl polyamine carbamates such as indicated above.

(2) Aromatic polyamine carbamates such as 1,8-diamino-naphthalene carbamate, 1,3,5-triaminobenzene carbamate, phenylene diamine carbamate, xylylenediamine carbamate (3) Polyethylene amine carbamates such as triethylene tetramine carbamate, tetraethylene pentamine carbamate, etc.

It is to be expressly understood that the present invention is clearly distinguished from the use of amines, in general, as well as amine carbamates in compounding other types of rubbers. For example, it has been suggested to use amine carbamates in curing "Viton" rubber, a copolymer of vinylidine fluoride and hexafluoropropylene which contains about 65% combined fluorine. This rubber is basically different from chlorinated butyl rubber which contains only a small proportion of combined halogen. Further, such cures of "Viton" rubber do not offer the advantages of the present invention, e.g., fast curing rates at relatively low temperatures. They require high temperatures and post curing.

The various aspects and modifications of the present invention will be made more clearly apparent by reference to the following description and accompanying examples.

CHLORINATED BUTYL RUBBER "A"

A copolymer of about 97% isobutylene and 3% isoprene having a viscosity average molecular weight of 500,000 was dissolved in hexane to form about a 10% solution. To this polymer solution, about 5 weight percent of chlorine was added and reacted for 30 minutes with the polymer at room temperature. The resulting chlorinated copolymer was isolated by flashing technique, collected and dried and analyzed and found to have a viscosity average molecular weight of about 450,000 and to contain 1.1–1.3% chlorine based on the polymer. It had a Mooney viscosity of 52±5 (212° F. for 8 minutes).

Other examples of halogenated isoolefin-multiolefin copolymers suitable for the practice of the present invention are tabulated in Table I.

Table I

| Halogenated Rubber | Isoolefin, percent [1] | Multiolefin, percent [1] | Halogenation Agent | Percent Halogen in the Rubber [1] |
|---|---|---|---|---|
| B | Isobutylene (95) | Isoprene (5) | $Cl_2$ in $CCl_4$ | 2.5 chlorine. |
| C | Isobutylene (92) | Myrcene (8.0) | $Cl_2$ in $CCl_4$ | 1.6 chlorine. |
| D | Isobutylene (92) | Butadiene (8) | Gaseous chlorine | 2.8 chlorine. |

[1] Note: Percent in all instances is percent by weight.

EXAMPLE 1

Vulcanization recipes containing 100 parts by weight of heretofore described chlorinated butyl rubber "A," 50 parts by weight of SRF carbon black, 0.5 part by weight stearic acid, 0.5 part by weight 2,2'-methylene-bis(4-methyl-6-tertiary butyl phenol) (commercially sold as Antioxidant 2246) and the minor portions of hexamethylene diamine carbamate indicated in Table II were prepared by milling on a cold mill. Mooney scorch values were determined at 260° F. All the recipes were thereafter cured at 300° F. for 60 minutes, the properties of the vulcanizates thus obtained being set forth in Table II.

Table II

| Recipe No | 1 | 2 | 3 | 4 | 5 |
|---|---|---|---|---|---|
| Hexamethylene diamine carbamate | 1 | 1.5 | 2.0 | 2.5 | 3.0 |
| Mooney Scorch, 260° F.[a]: | | | | | |
|   Initial reading | 30 | 30 | 29 | 30 | 29 |
|   5 minute reading | 27 | 26 | 26 | 26 | 26 |
|   10 minute reading | 27 | 26 | 25 | 26 | 26 |
|   Time to 5 point rise | >30 | >30 | >30 | >30 | >30 |
| Tensile, p.s.i. | 1,210 | 1,375 | 1,570 | 1,540 | 1,425 |
| Modulus/300%, p.s.i. | 500 | 650 | 705 | 740 | 650 |
| Elongation, percent | 605 | 515 | 560 | 565 | 585 |
| Shore A Hardness [b] | 50 | 50 | 51 | 53 | 53 |
| Ozone Resistance (0.2% ozone atmosphere): | | | | | |
|   Time to crack, minutes | 91 | 93 | 90 | 90 | 90 |
|   Time to break, minute | 235 | 325 | 290 | 300 | 325 |

[a] Mooney scorch values in all experiments in this specification were measured by the standard procedure using the small rotor at 260° F. described in ASTM D 927-57T.
[b] Measured in accordance with ASTM procedure D 676-57.

The data in Table II shows that polyamine carbamates (hexamethylene diamine carbamate) cure chlorinated butyl rubber to produce vulcanizates of good physical properties. The vulcanizate showed exceptional resistance to scorching as evidenced by the fact that over 30 minutes were required to cause a five point rise in scorch value. Moreover, outstanding ozone resistance was shown by the cured rubbers. In a conventional sulfur-cured formulation, the vulcanizate would crack very quickly and break within 15–30 minutes as contrasted with the 200 to 300 minutes tolerance observed with the vulcanizates of the present invention.

Further, a particularly suitable range of 2.0 to 3.0 parts of polyamine carbamate per hundred parts of halogenated rubber is indicated.

EXAMPLE 2

Several portions of recipe 4 of Table II (2.5 phr. of hexamethylene diamine carbamate) were cured at 320° and 400° F. for varying intervals of time. Results are set forth in Table III.

Table III

| Cure temperature, ° F | 400 | 400 | 320 |
|---|---|---|---|
| Cure time, minutes | 1 | 3 | 10 |
| Tensile, p.s.i. | 1,275 | 1,250 | 1,575 |
| Elongation, percent | 485 | 385 | 640 |
| Modulus/300%, p.s.i. | 725 | 990 | 600 |

The data of Table III show how the compositions of the present invention uniquely combine fast cure rates and processing safety (long scorch times). Vulcanizates of good physical properties were obtained in cure times of less than 15 minutes, e.g., 1 or 3 minutes. The same recipe (Recipe No. 4) which gives excellent physical values when cured for 1 minute at 400° F. shows a scorch of more than 30 minutes (see Table II). This desirable and unusual behavior is especially useful for curing electrical insulation and other applications where extrusion techniques are employed.

EXAMPLE 3

To illustrate the advantages of the present invention over the simple use of polyamines, the following data are presented:

Table IV

| | Run A | Run B |
|---|---|---|
| Formulations: | | |
|   Chlorinated Butyl Rubber "A" | 100 | 100 |
|   SRF Carbon Black | 50 | 50 |
|   Stearic acid | 0.5 | 0.5 |
|   Hexamethylene diamine | 0 | 2.0 |
|   Hexamethylene diamine carbamate | 2.0 | 0 |
| Mooney scorch at 260° F.: | | |
|   Time to 5 point rise, mins | over 30 | less than 5 |

The above data show that using a typical polyamine as a curing agent gives rapid scorching (run B) while the polyamine carbamate cures (shown in run A and the previous examples) show excellent resistance to scorching. Recipes employing other amines such as phenylene diamine and diethylene diamine have also been found to be much inferior to the present invention with respect to scorching, i.e., they required less than 10 minutes to show a five point rise in scorch, whereas, the present compositions require substantially more than 10 minutes.

EXAMPLE 4

100 parts of chlorinated butyl rubber "A" were compounded with the same amounts and type of ingredients shown in Example 1 except that ethylene diamine carbamate was used as the curative. The following data were obtained after curing at 300° F. for sixty minutes.

Table V

| Recipe No | 1 | 2 | 3 | 4 | 5 |
|---|---|---|---|---|---|
| Ethylene diamine carbamate, p.h.r. | 0.7 | 1.5 | 2.0 | 2.4 | 3.0 |
| Mooney Scorch, 260°F. (prior to curing): | | | | | |
|   Initial reading | 26 | 25 | 26 | 26 | 26 |
|   5 minute reading | 24 | 23 | 24 | 24 | 24 |
|   10 minute reading | 24 | 24 | 24 | 24 | 24 |
|   Time to 5 point rise, minutes | 28 | >30 | 25 | >30 | 30> |
| Tensile, p.s.i. | 1,310 | 1,530 | 1,590 | 1,515 | 1,550 |
| Modulus/300%, p.s.i. | 790 | 850 | 1,050 | 950 | 1,060 |
| Elongation, percent | 460 | 445 | 400 | 415 | 390 |

These data demonstrate that ethylene diamine carbamate is satisfactory as are all diamine carbamates for utilization in this invention.

Compound 2 of Table V, when cured at 320° F. for 5 minutes, gave a tensile strength of 1460 p.s.i. and an elongation of 700% demonstrating the unique combination of scorch safety and fast curing which characterizes the present invention.

Various modifications may be made to the present invention. The present composition may be used for wire coatings, extruded or molded items such as tires, tubes, conveyor belting, etc., and various other conventional applications for rubbery copolymers. Although it will normally neither be necessary nor desirable to add other curing agents to the present vulcanization recipe, the present invention may encompass such a procedure. The most advantageous results are obtained by the use of a chlorinated isoolefin-multiolefin copolymer. Other halogenated butyls may also be cured to give vulcanizates of good properties.

For example, the following formulation, when cured at 300° F. for sixty minutes, gave a vulcanizate of 1790 p.s.i. tensile strength, 375% elongation and a modulus at 300% of 1350 p.s.i.

Table VI

| | Parts by weight |
|---|---|
| Brominated butyl rubber [1] | 100 |
| Carbon black | 50 |
| Stearic acid | 0.5 |
| 2,2'-methylene-bis(4-methyl-6-tertiary butyl phenol) (Antioxidant 2246) | 0.5 |
| Hexamethylene diamine carbamate | 1.0 |

[1] A brominated butyl rubber of about 97% isobutylene and 3% isoprene, having a viscosity average molecular weight of 250,000 and containing 2.2 weight percent combined bromine (sold by the B. F. Goodrich Company as Hycar 2202).

Having described the present invention, that which is sought to be protected is set forth in the following claims.

What is claimed is:

1. An improved rubbery composition which comprises a rubbery chlorinated copolymer of 85 to 99.5 weight percent of $C_4$ to $C_8$ isoolefin and 15 to 0.5 weight percent of a $C_4$ to $C_{14}$ multiolefin, said copolymer having a mol percent unsaturation of 0.5 to 20 and containing at least 0.3 weight percent chlorine but not more than about 1 atom of combined chlorine per double bond in said copolymer; and 0.1 to 15 wt. percent based on said copolymer of hexamethylene diamine carbamate.

2. An improved rubbery composition which comprises: a rubbery chlorinated copolymer of 85 to 99.5 weight percent of $C_4$ to $C_8$ isoolefin and 15 to 0.5 weight percent of a $C_4$ to $C_{14}$ multiolefin, said copolymer having a mol percent unsaturation of 0.5 to 20 and containing at least 0.3 weight percent chlorine but not more than about 1 atom of combined chlorine per double bond in said copolymer; and 0.1 to 15 wt. percent based on said copolymer of ethylene diamine carbamate.

3. A process which comprises vulcanizing a chlorinated copolymer of about 85 to 99.5 weight percent of a $C_4$ to $C_8$ isoolefin and about 15 to 0.5 weight percent of a $C_4$ to $C_{14}$ multiolefin with 0.1 to 15 parts by weight of hexamethylene diamine carbamate at a temperature in the range of 225° to 500° F. utilizing a cure time of less than 15 minutes.

4. A process which comprises vulcanizing a chlorinated copolymer of about 85 to 99.5 weight percent of a $C_4$ to $C_8$ isoolefin and about 15 to 0.5 weight percent of a $C_4$ to $C_{14}$ multiolefin with 0.1 to 15 parts by weight of ethylene diamine carbamate at a temperature in the range of 225° to 500° F. utilizing a cure time of less than 15 minutes.

References Cited in the file of this patent

UNITED STATES PATENTS

| 2,875,175 | Ambelang | Feb. 24, 1959 |
| 2,891,595 | Kuntz et al. | June 23, 1959 |
| 2,933,481 | Rugg | Apr. 19, 1960 |